(12) United States Patent
Nicot

(10) Patent No.: US 6,694,828 B1
(45) Date of Patent: *Feb. 24, 2004

(54) TORQUE SENSOR FOR A TURNING SHAFT

(75) Inventor: Christophe Nicot, Roo Rue de la Prairie (FR)

(73) Assignee: The Torrington Company, Torrington, CT (US)

(*) Notice: Subject to any disclaimer, the term of this patent is extended or adjusted under 35 U.S.C. 154(b) by 0 days.

This patent is subject to a terminal disclaimer.

(21) Appl. No.: 09/243,840

(22) Filed: Feb. 3, 1999

(30) Foreign Application Priority Data

Feb. 4, 1998 (FR) .............................. 98 01293

(51) Int. Cl.⁷ ................................ G01L 3/14
(52) U.S. Cl. .......................... 73/862.326; 73/862.08; 73/862; 318/433; 180/422
(58) Field of Search .................. 73/862.33, 862.36, 73/862.335, 862.321, 862.08, 862

(56) References Cited

U.S. PATENT DOCUMENTS

| 5,009,110 A | * | 4/1991 | Lang et al. .............. 73/862.33 |
| 5,501,110 A | * | 3/1996 | Peilloud et al. ........ 73/862.321 |
| 5,731,529 A | | 3/1998 | Nicot |
| 6,227,060 B1 | * | 5/2001 | Nicot et al. .............. 73/862.08 |
| 6,269,702 B1 | * | 8/2001 | Lambson ............... 73/862.045 |
| 6,427,542 B1 | * | 8/2002 | Nicot .................... 73/862.326 |

* cited by examiner

Primary Examiner—Edward Lefkowitz
Assistant Examiner—Andre Allen
(74) Attorney, Agent, or Firm—Michael Best & Friedrich LLP

(57) ABSTRACT

A device includes at least one magnetic field generator placed on a first plane of a right section of a shaft and at least one magnetic field detector placed in a second plane of a right section of the shaft. The detector produces a signal proportional to the torque following the relative angular shift of the field generator in relation to the detector, the magnetic field generator having a magnetic structure supported by support mechanisms connected to the turning shaft. The magnetic field detector is located roughly opposite the magnetic field generator and is supported by support mechanisms connected to the turning shaft.

33 Claims, 13 Drawing Sheets

TORQUE SENSOR FOR A TURNING SHAFT

This invention relates generally to the technical field of torque sensors and, more particularly, to a device for measuring the torque applied to a shaft.

In order to measure the torque imparted between two turning parts, elastically deforming torque meters are generally used. The deforming element frequently consists of a torsion bar. In order to prevent warp torsion and a concentration of stresses that may affect resistance to fatigue, torsion bars on torque meters are usually circular in cross section. For any given material, in isotropic linear elasticity, the angle of torsion θ equals, in pure torsion:

$$\theta = \frac{32 \, ML}{\pi D^4 G}$$

where
- D is the outer diameter of the bar, whether hollow or solid;
- M is the torque applied to the torsion bar;
- G is the crosswise modulus of elasticity; and
- L is the working length of the bar.

Thus, given the material and geometry of a specific bar, it is possible to link the torsion angle to the torque applied to the bar.

Torsion bar torque meters are described in the following documents: FR-2 705 455, GB-2 306 641, WO-87/02319, WO-92/20560, WO-95/19557. WO-96/06330, WO-97/08527, WO-97/09221, EP-325 517, EP-369 311, EP-286, 053, EP-437 437, EP-418 763, EP-453 344, EP-515 052, EP-555 987, EP-562 426, EP-566 168, EP-566 619, EP-638 791, EP-673 828, EP-681 955, EP-728 653, EP-738 647, EP-738 648, EP-765 795, EP-770 539, EP-802 107.

The primary methods for measuring the torque of a turning shaft, whether including the use of a torsion bar or not, are as follows:
- methods based on electromagnetic phenomena
- optical methods
- electrical methods.

Magnetic methods are based essentially on the use of magnetostriction and the Hall effect.

Magnetostriction is understood to be a reversible mechanical deformation that accompanies a magnetic variation of a ferromagnetic solid. This phenomenon is reversible; that is, a deformation of a ferromagnetic material placed in a magnetic field causes a variation in magnetism (inverse magnetostriction). Examples of magnetostrictive detectors that measure torque by measuring variations in permeability of a magnetically anisotropic field are described in the following documents: EP-229 688, EP-261 980, EP-270 122, EP-288 049, EP-309 979, EP-321 662, EP-330 311, EP-338 227, EP-384 042, EP-420 136, EP-422 702, EP-444 575, EP-502 722, EP-523 025, EP-562 012, and EP-651 239.

The Hall effect is conventionally understood to be the generation of a normal magnetic field at the current density vector in a conductor or semiconductor located in a normal magnetic induction field at the current density vector. Torque sensors that operate using the Hall effect, are described in the following documents: FR-2,689,633, and FR-2,737,010.

Optical methods for measuring torque are essentially associated with interference phenomena or a measurement of optical density. Reference to these methods may be found, for example, in the following documents: EP-194 930, EP-555 987, U.S. Pat. Nos. 5,490,450, 4,676,925, 4,433, 585, 5,001,937, 4,525,068, 4,939,368, 4,432,239, FR-2 735 232, FR-2 735 233, and WO-95/19557.

Electric torque measuring methods are associated essentially with capacitative measurement or measurement of a phase difference between two magnetic encoders mounted circumferentially on the torsion axis. Documents EP-263 219, EP-352 595, EP-573 808 describe devices to measure torque by extensiometric or stress gauges. Document EP-442 091 describes a mechanism to measure the angle of rotation or torque of a rotating or fixed element on a machine, which includes a torsion element in the shape of a wheel with spokes connected to various measuring devices, at least one spoke of the spoked wheel being cut so that the parts of the spoke or spokes are applied against one another after shifting caused by a predetermined bending of the other spokes. The measurement device employs Foucault currents.

The foregoing illustrates limitations known to exist in present devices and methods. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the invention, this is accomplished by providing a device to measure torque on a turning shaft, the measuring device comprising at least one magnetic field generator placed in a first plane of a right section of the shaft, and at least one magnetic field detector placed in a second plane of a right section of the shaft. The detector produces a signal proportional to the torque producing a relative angular shift of the field generator in relation to the detector. The magnetic field generator is supported by support means connected to the turning shaft, the magnetic field detector is located roughly opposite the magnetic field generator and is supported by support means connected to the turning shaft.

The foregoing and other aspects will become apparent from the following detailed description of the invention when considered in conjunction with the accompanying drawing figures.

BRIEF DESCRIPTION OF THE DRAWING FIGURES

Figure 11:
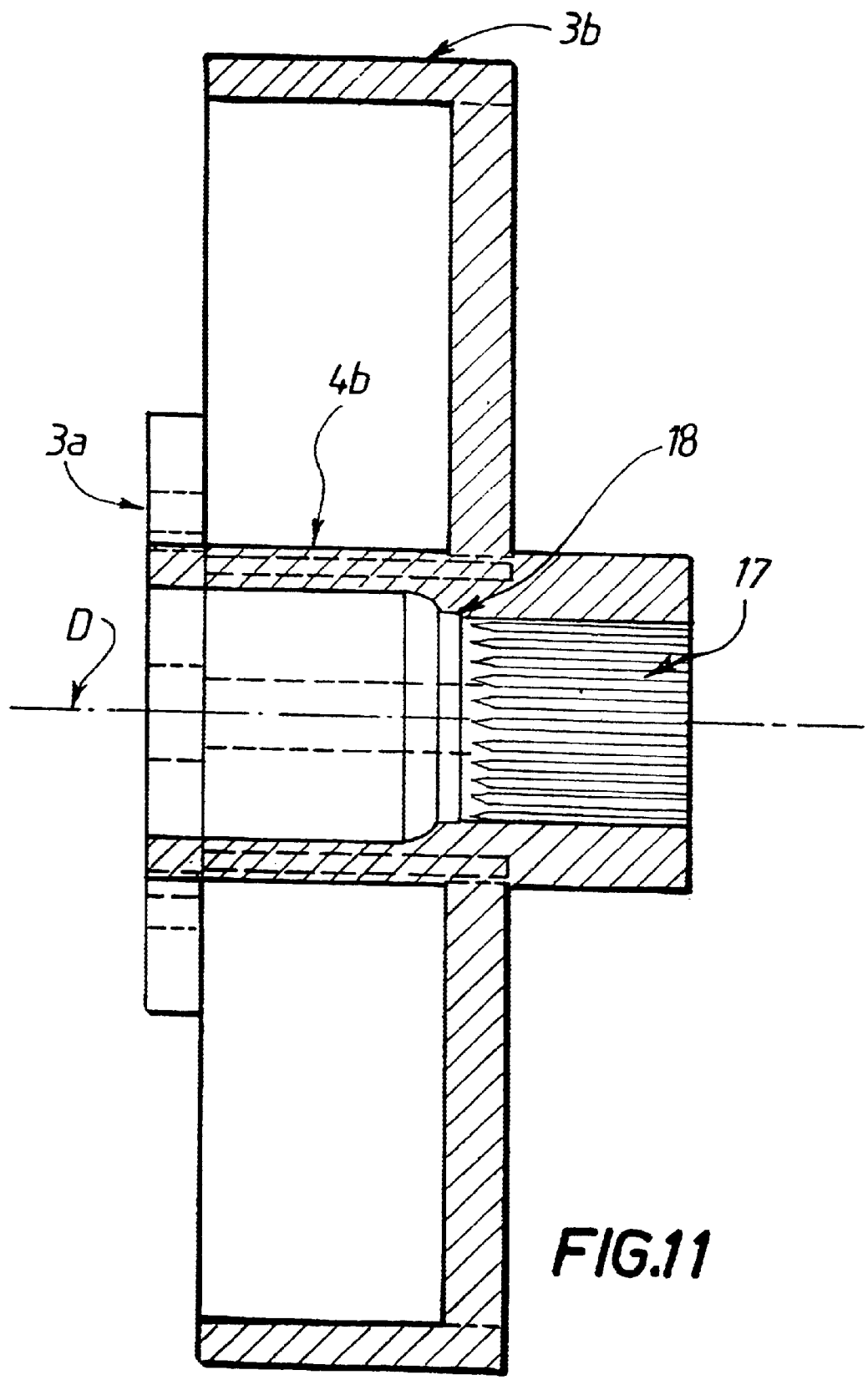
FIG. 11 is a cross sectional view along line XI—XI of FIG. 10.
Figure 12:
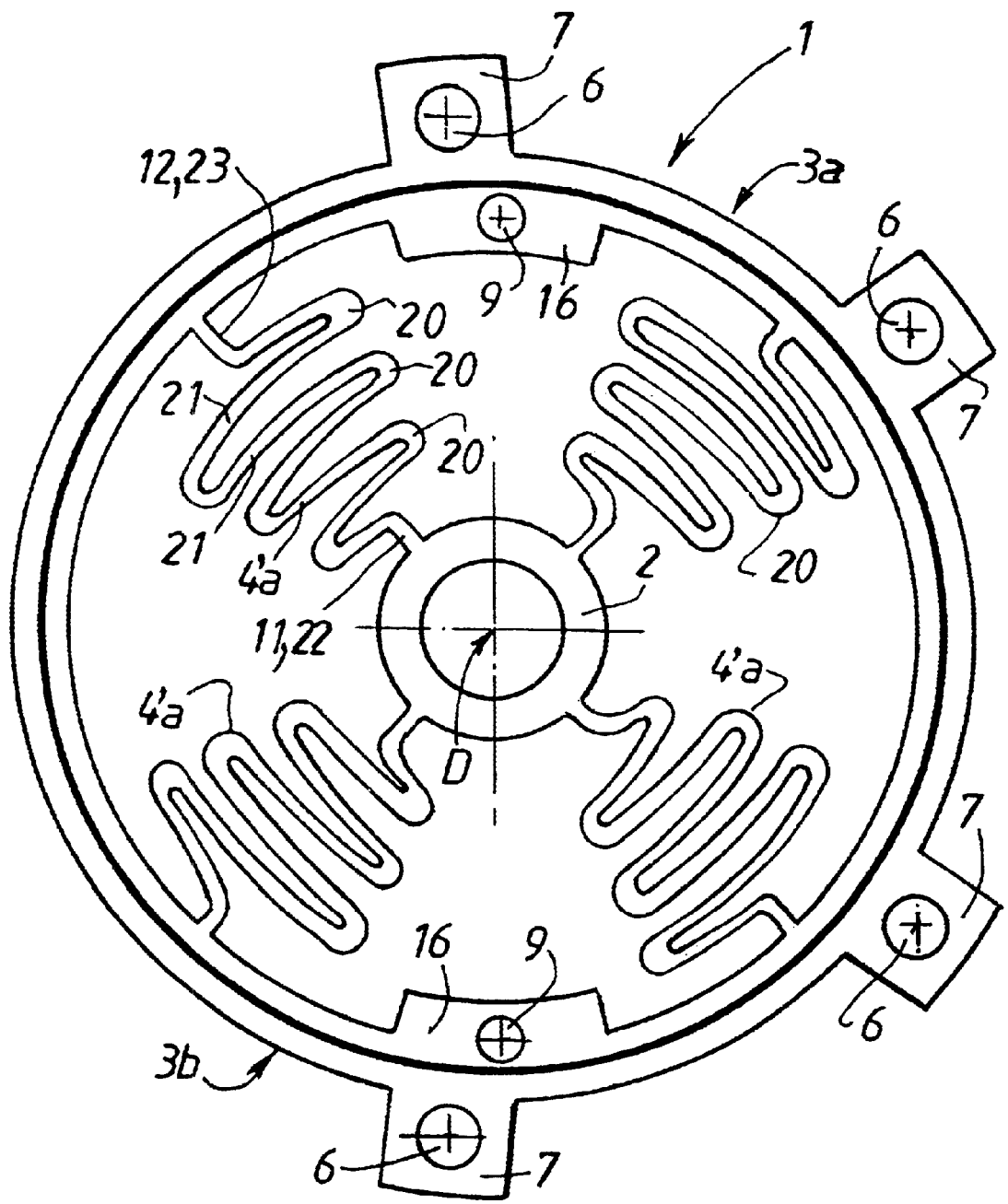
Figure 13:
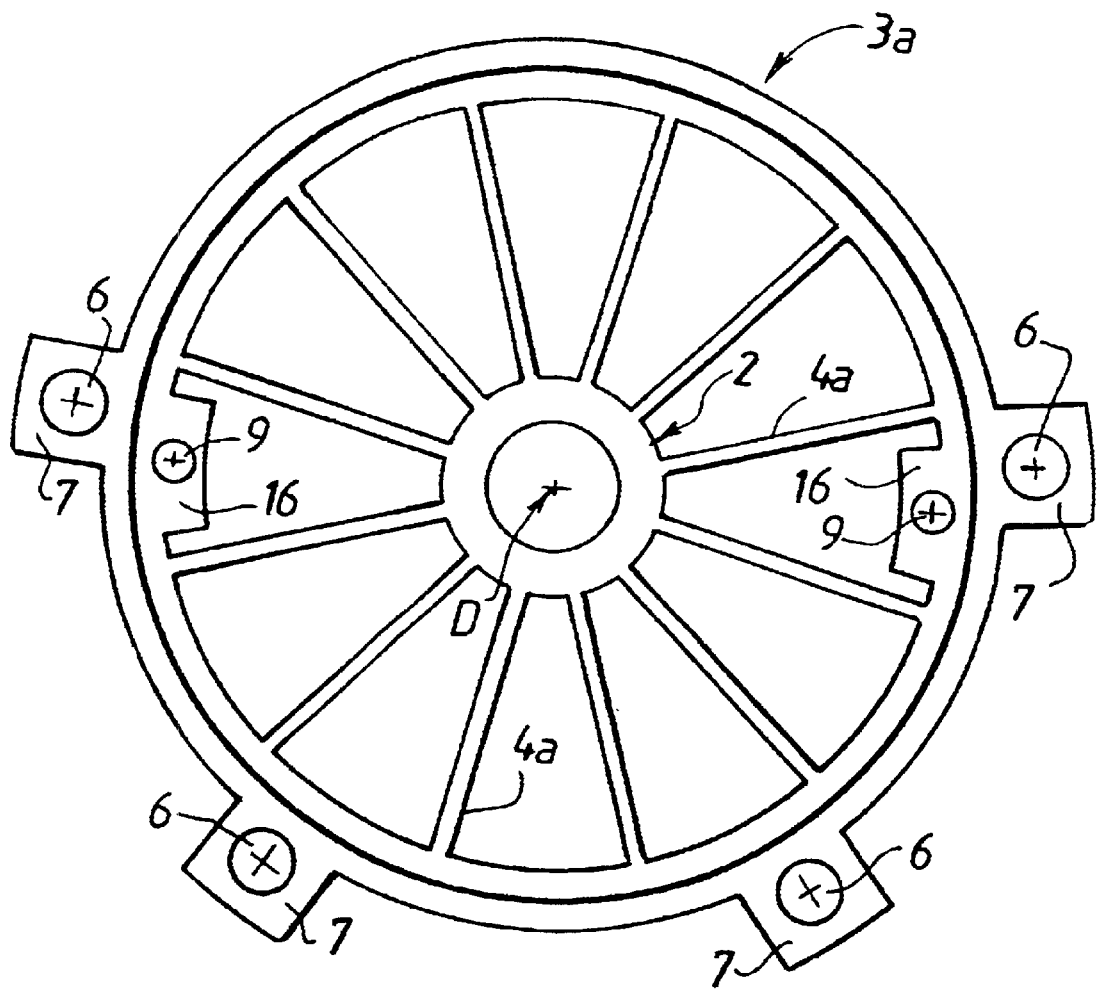
Figure 14:
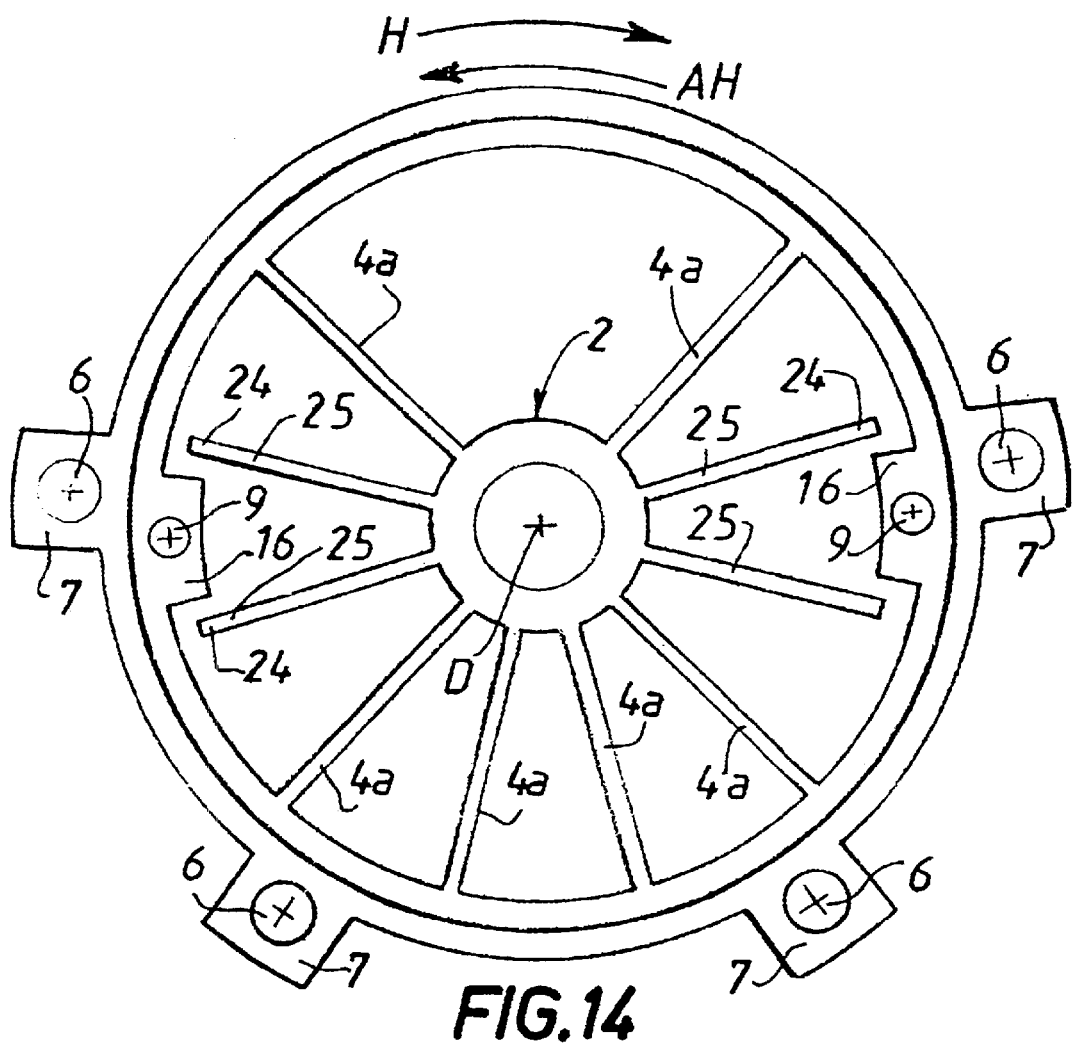
Figure 15:
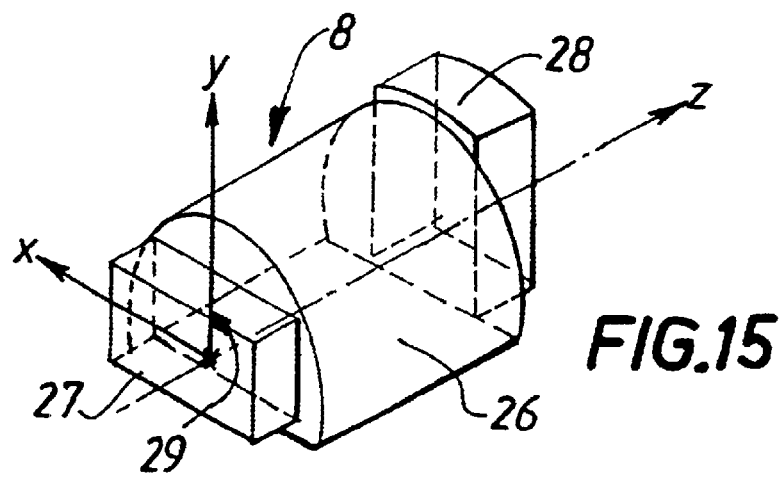

FIGS. 12, 13, and 14 are front views of hubs with bending test bodies illustrating other embodiments of the present invention; and FIG. 15 is a schematic drawing in perspective of a Hall effect sensor designed to be integrated in a hub as illustrated in FIGS. 1 through 14, according to one embodiment of the present invention.

DETAILED DESCRIPTION

Figure 1:
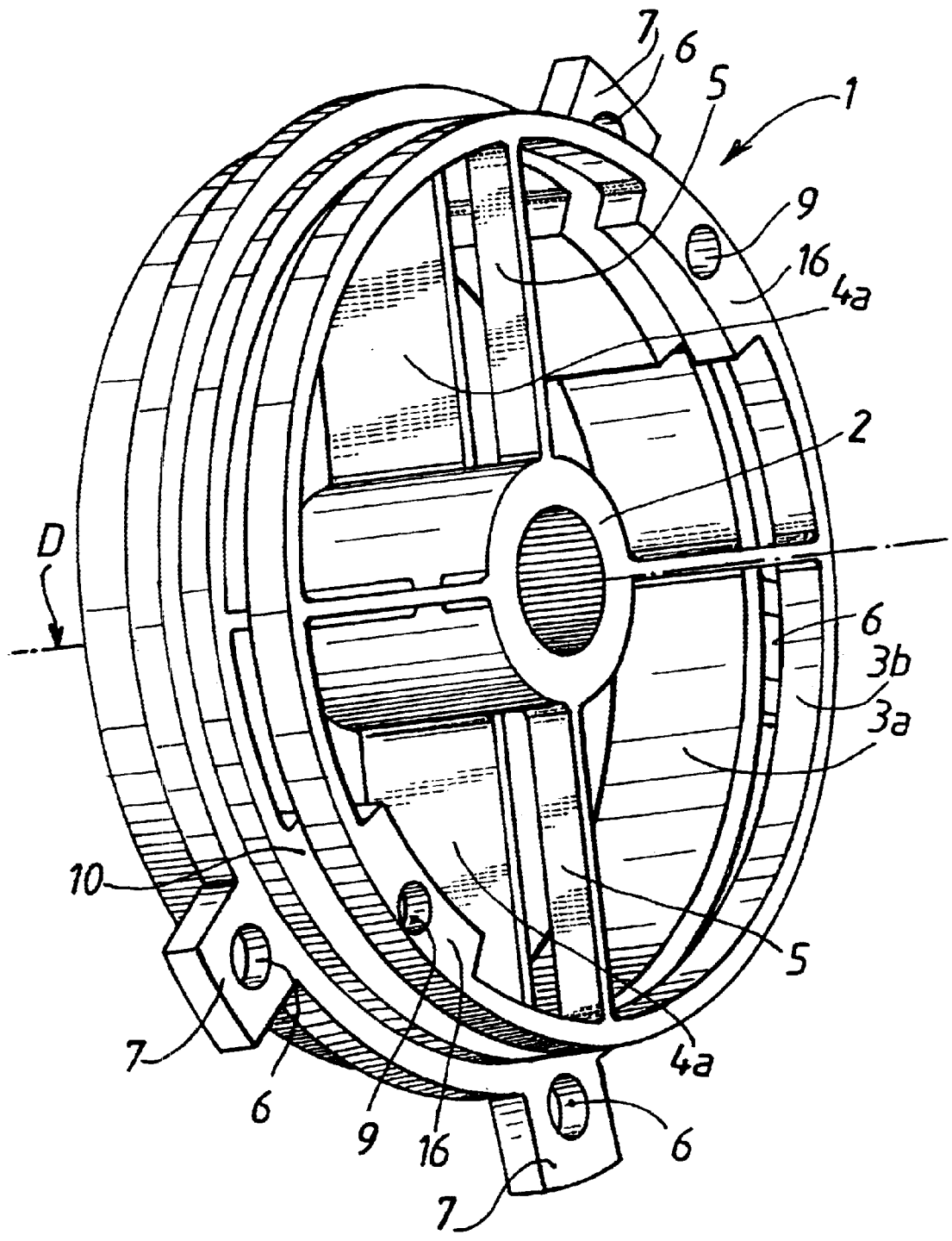
FIG. 1 is a perspective view of a hub with a bending test body illustrating one embodiment of the present invention.
Figure 2:
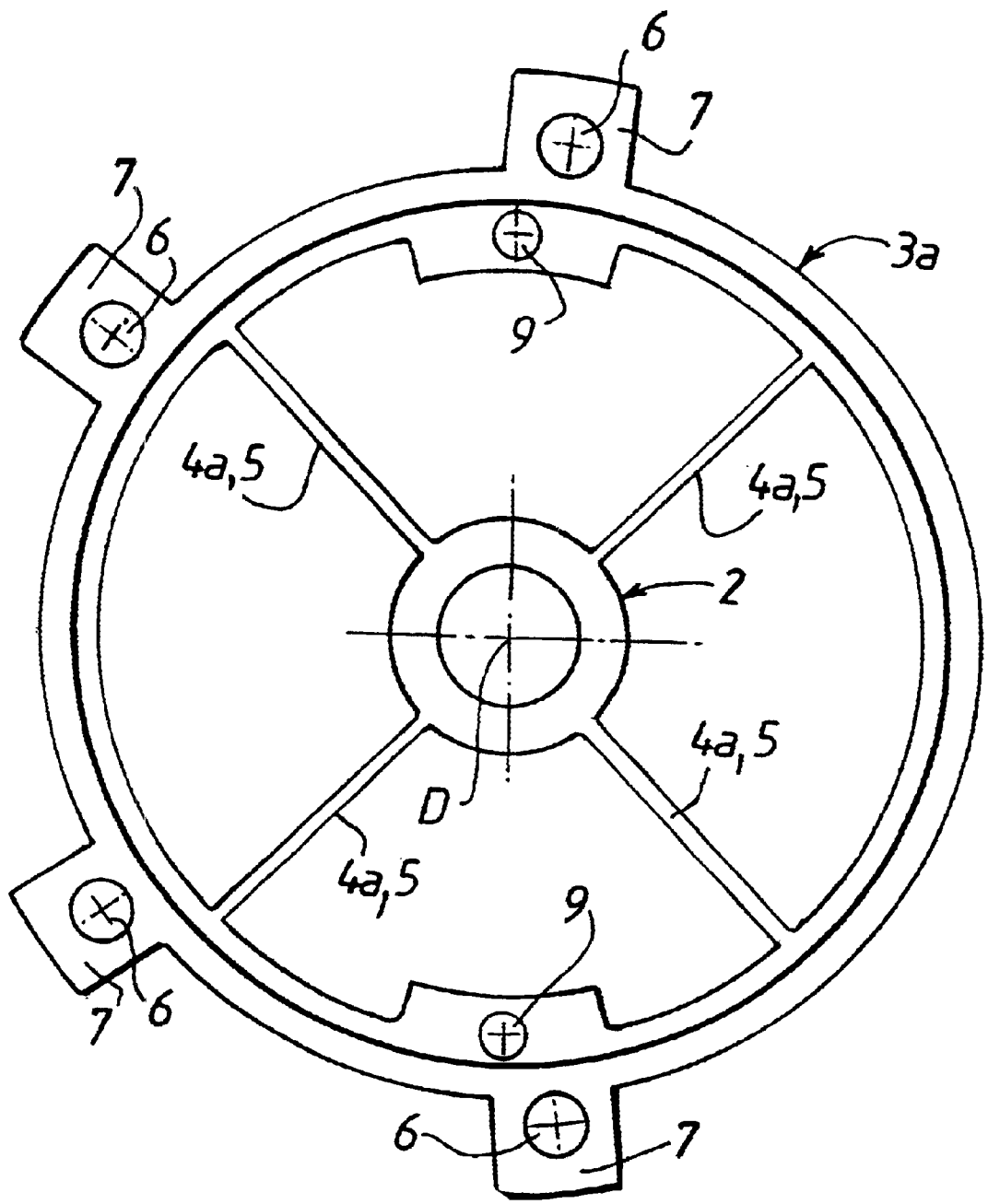
FIG. 2 is a front view of the hub with a bending test body of FIG. 1.

Referring now to the drawings, FIG. 1 illustrates a hub with a bending test body, in perspective, designed to be integrated between a drive mechanism on a drive shaft and the drive shaft, or between a driving shaft and a drive shaft. Hub 1 includes cylindrical inner ring 2 and two outer rings 3a, 3b connected to inner ring 2 by elastically bending beams 4a and nondeforming beams 5.

More precisely, the outer ring 3a, to be fixed on a drive mechanism of a drive shaft by screws or the like passing through holes 6, is connected to the inner ring by means of elastically bending beams 4a. Outer rings 3a, 3b are, in this embodiment, roughly coaxial and of the same average diameter. In this embodiment, there are four deformable beams 4a evenly distributed circumferentially and directed perpendicularly to axis D of the drive shaft. In other embodiments, not illustrated, there may be two, three, or more than four of these deformable beams.

Outer ring 3b is connected to inner ring 2 by means of nondeforming radial beams 5. In the illustrated embodiment, there are as many nondeforming beams 5 as there are elastically bending beams 4a, beams 4a and 5 being generally located along two radial planes that are perpendicular to the axis of drive shaft D. In other embodiments, not shown, there may be two, three, or more than four beams 5, while there are four beams 4a. In certain embodiments, not shown, the number of beams 4a is not equal to four and not equal to the number of beams 5. In other embodiments, not shown, the number of beams 4a is equal to the number of beams 5, and that number is not equal to four. In yet other embodiments, not shown, outer ring 3b is connected to inner ring 2 by means of a ring-shaped web.

Beams 4a, 5 may be positioned directly above one another, as shown, on common radial planes. In other embodiments, not shown, beams 5 may be positioned on radial planes that are shifted in relation to the radial planes of beams 4a. Outer deformable ring 3a of hub 1 is rigidly connected to the drive shaft drive mechanism, using screws or any equivalent fastener through holes 6 on attachment feet 7. In a variant, the hub with the bending test body may form a single unit with the drive mechanism on the drive shaft, made of the same material as the latter, for example, or welded to it using any appropriate method.

When the drive shaft drive mechanism exerts force on outer ring 3a, it causes beams 4a to bend in deformation, which deformation is stronger the more torque stress is imparted to the drive shaft. Outer ring 3b remains generally stress-free. Its position may, therefore, serve as a reference point for purposes of measuring the shift of outer ring 3a. Outer ring 3b carries sensors 8 capable of measuring small shifts on the order a few microns or hundreds of microns. In the illustrated embodiment, there are two of these sensors 8 located in axially aligned housings 9 provided in outer ring 3b adjacent to outer ring 3a.

Sensors 8 are Hall effect or magnetoresistant sensors. While a single Hall effect sensor would suffice to measure small angular shifts, it is possible for reasons of reliability to place more sensors in measurement air gap 10 in order to achieve redundancy. Each sensor may have its own electronic circuit. By comparing or combining the signals emitted by two, three, or four different sensors, it is possible to detect the possible failure of one sensor and thereby ensure reliability of the torque meter.

Figure 3:
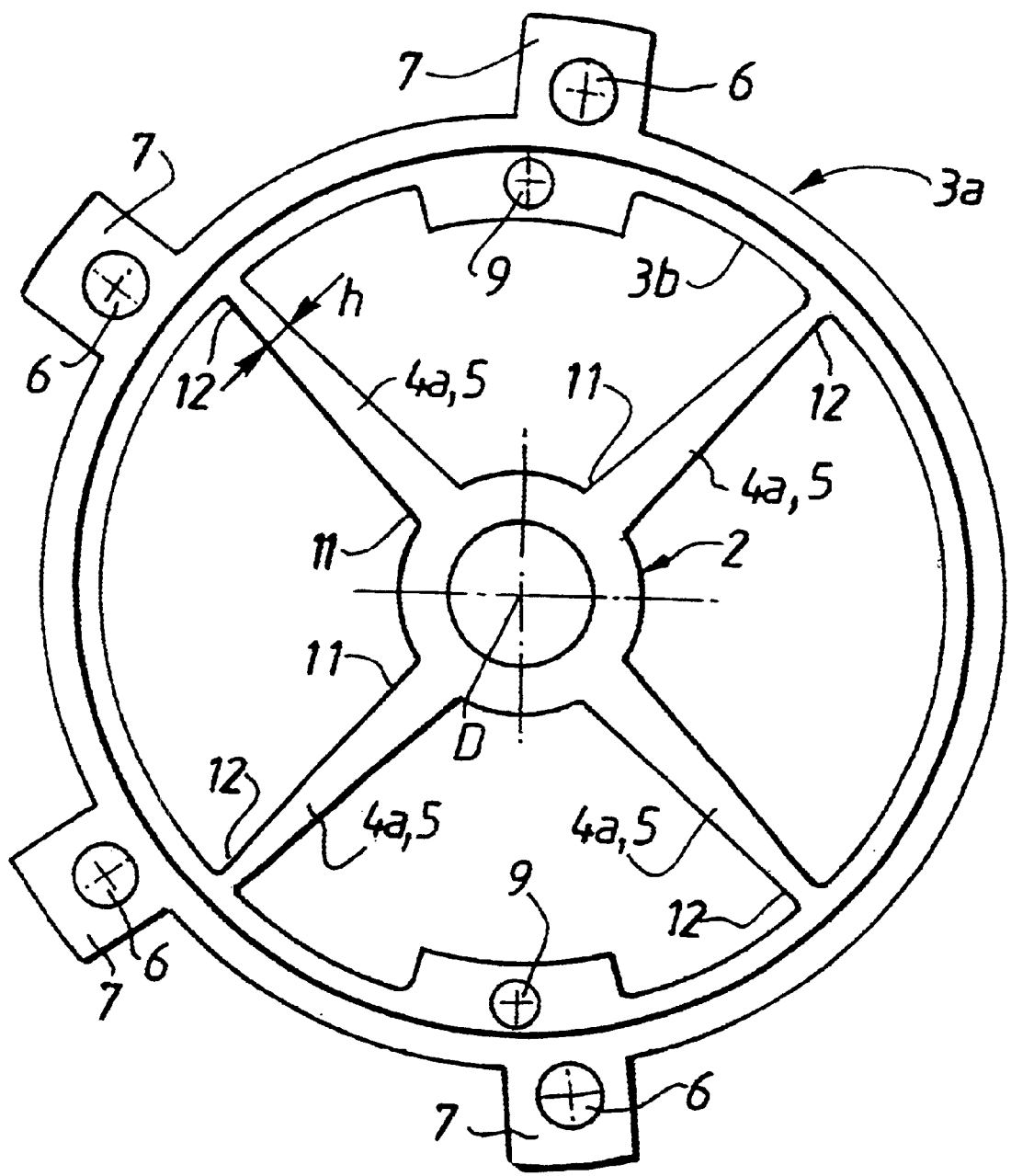
FIG. 3 is a front view of a hub with a bending test body illustrating another embodiment of the present invention.

A second embodiment of hub 1 with a bending test body is illustrated in FIG. 3. Like the hub that was just described, hub 1 represented in FIG. 3 includes deformable outer ring 3a, stress-free outer ring 3b, inner ring 2, deformable beams 4a connecting ring 3a to inner ring 2, and nondeformable beams 5 connecting ring 3b to inner ring 2. In the embodiment of FIG. 3, the hub has four beams 4a whose cross section varies from base 11 to head 12 of the beams. In other embodiments, the hub includes one, two, three, or more than four beams whose cross section varies from the base to the head.

This variation of the cross section of the beams may be regular or otherwise. This variation may be connected to a variation in the width of the beam and/or to a variation in the thickness of the beam. Thickness h of the beam is measured tangentially to a circle whose center is axis D of the drive shaft. In the embodiment of FIG. 3, this thickness h varies at a generally linear rate. In other embodiments, not shown, thickness h varies at a polynomial rate, or logarithmically, whether constantly or not, the farther one moves from axis D of the drive shaft. Width b of beams 4a, measured along direction D, is generally constant in the mode of embodiment shown in FIG. 3. In other modes of embodiment, not shown, width b may vary at linear or polynomial rates, the height h also being capable of variation.

Figure 4:
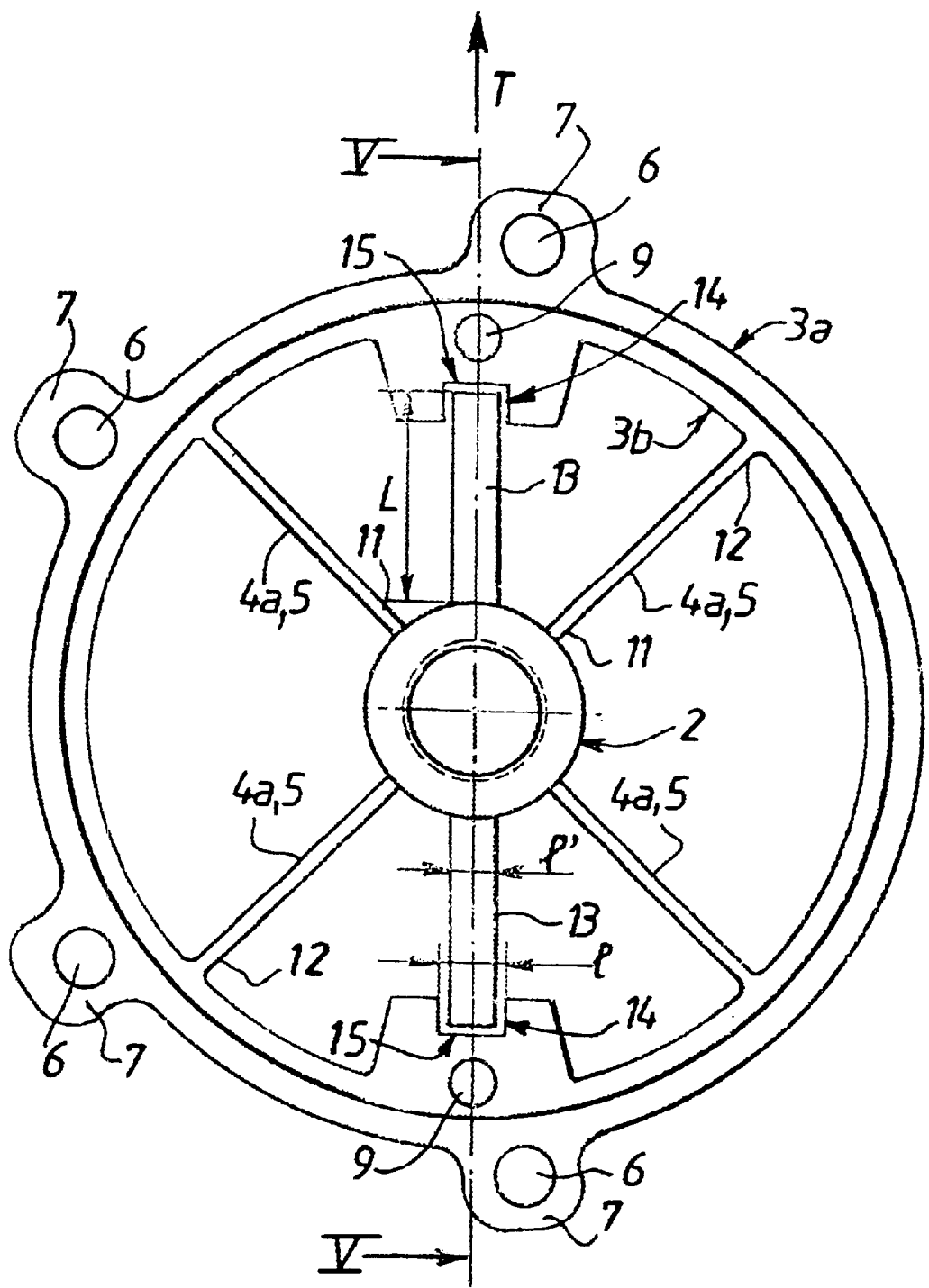
FIG. 4 is a front view of a hub with a bending test body provided with stop beams illustrating another embodiment of the present invention.
Figure 5:
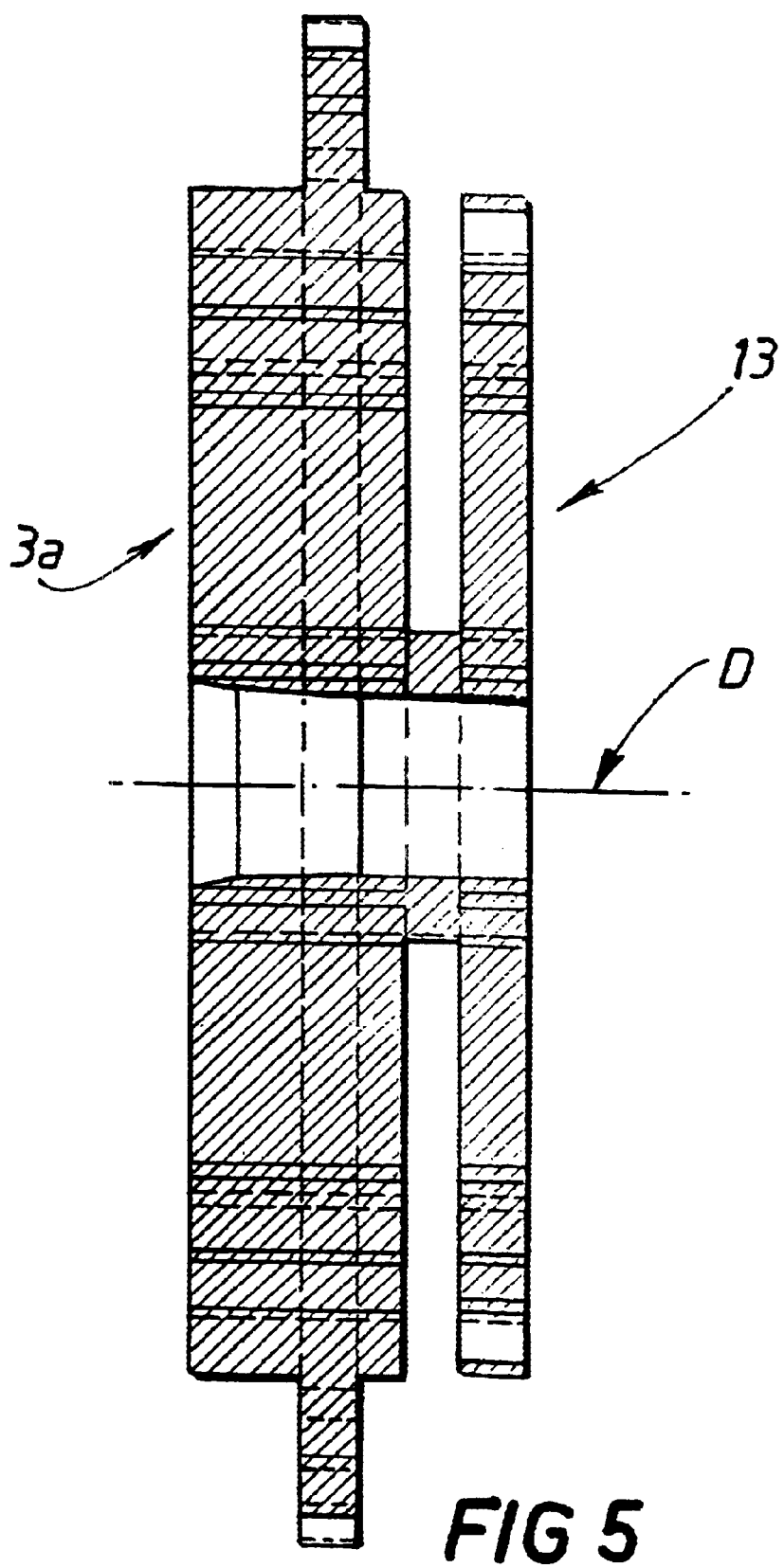
FIG. 5 is a cross sectional view along line V—V of FIG. 4.

FIG. 4 is a front view illustrating a hub with a bending test body equipped with stop beams 13. In the illustrated embodiment, two stop beams 13 run radially in a crosswise direction T from inner ring 2 to outer deformable ring 3a. The length L of stop beams 13 is less than that of deformable beams 4a, the end of each stop beam 13 being inserted, with predetermined play, into deformation stop 14. Deformation stops 14 project inward from outer ring 3a and include groove 15, whose width 1 is greater than the width 1' of stop beams 13. The play between the stops and beams 13, which relates to the difference in widths 1–1', may be determined as a function of the maximum allowable deformation of beams 4a, for example, to prevent their plastic deformation.

Figure 6:
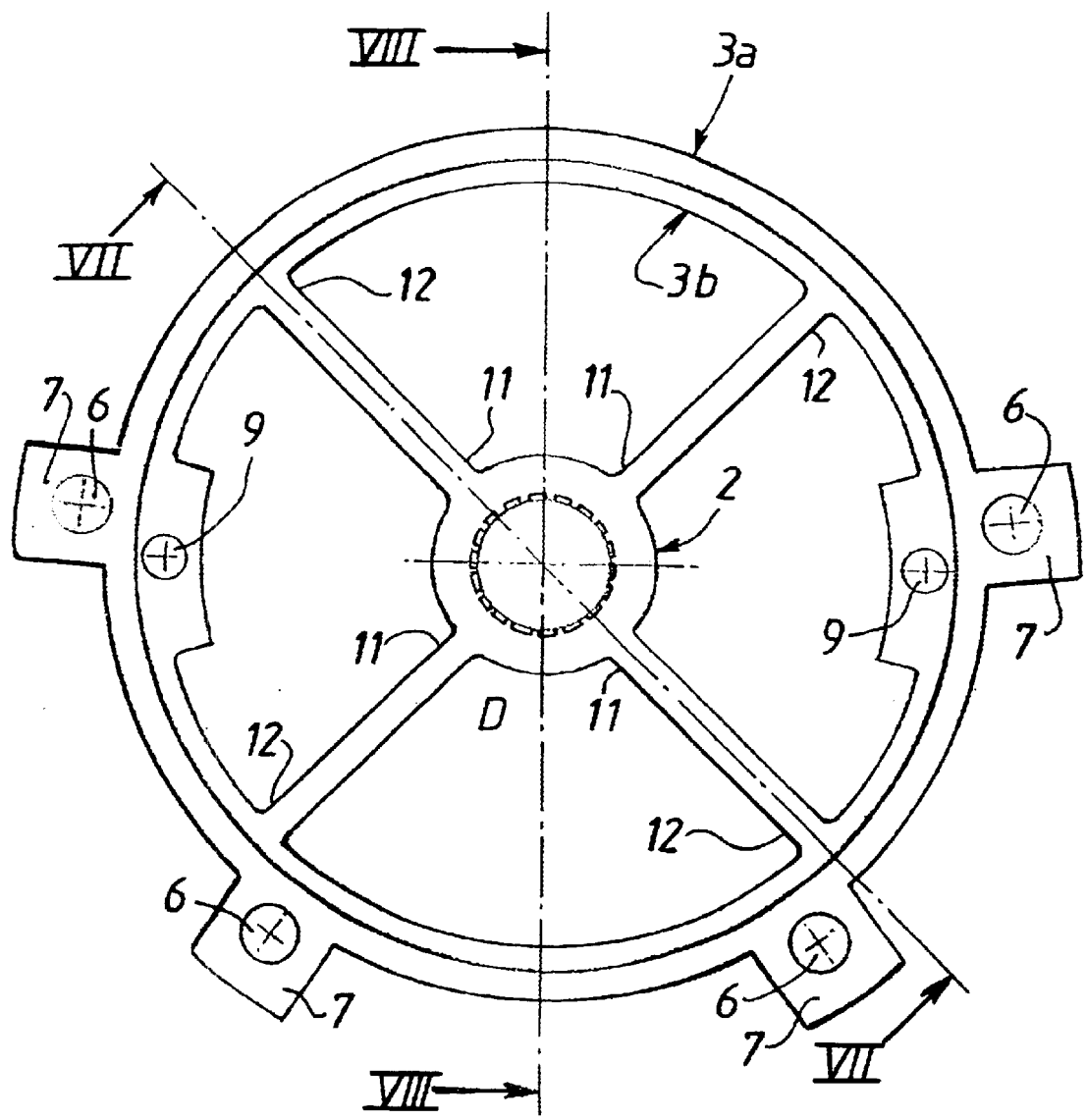
FIG. 6 is a front view of a hub with a bending test body illustrating another embodiment of the present invention.
Figure 7:
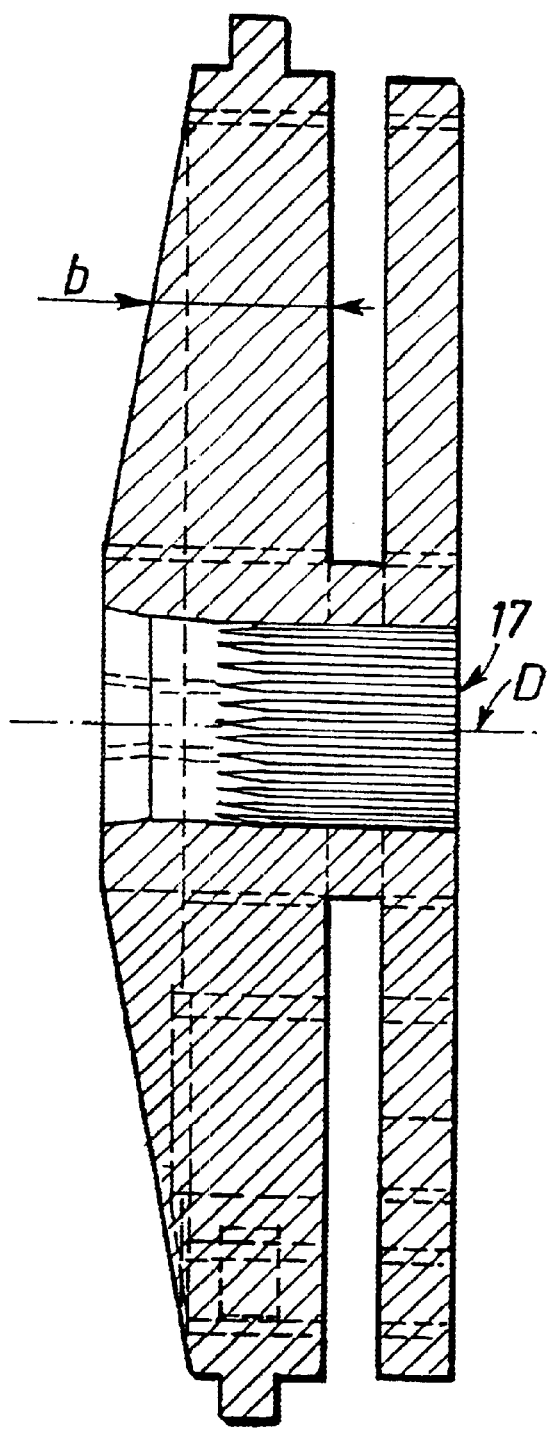
FIG. 7 is a cross sectional view along line VII—VII of FIG. 6.
Figure 8:
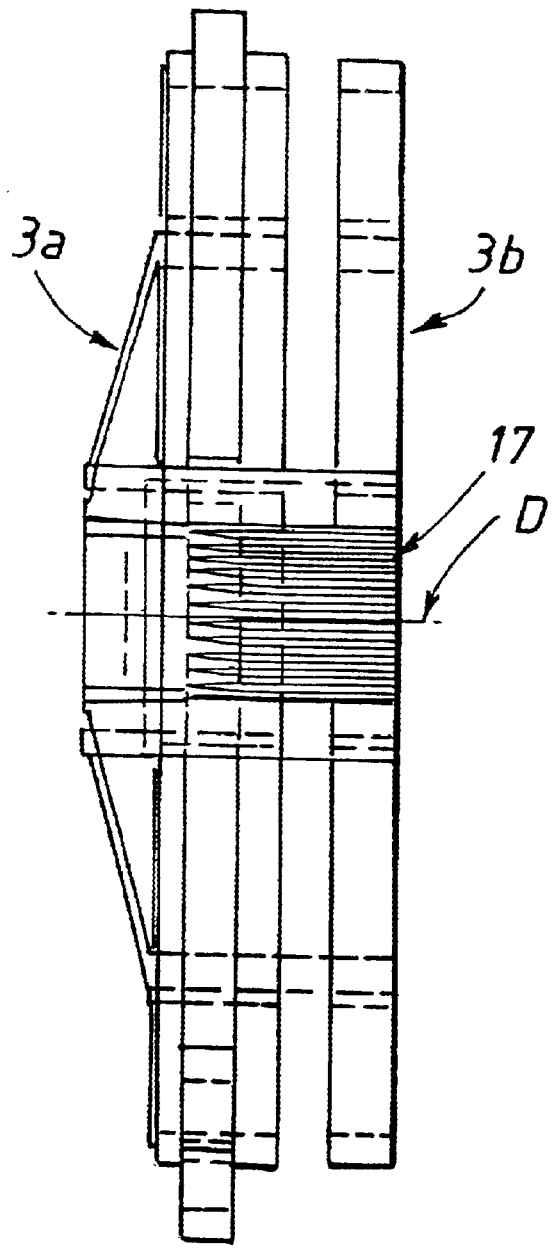
FIG. 8 is a cross sectional view along line VIII—VIII of FIG. 6.

FIGS. 6, 7 and 8 illustrate another embodiment of hub 1 with bending test body. In this embodiment, width b of deformable beams 4a decreases from base 11 to head 12 of the beams. This decrease may be linear or polynomial. The number of deformable beams 4a, the angular distribution, thickness, and height of the beams and the material used to make them, as will be clear to an expert in the art, will affect the inertia module and the maximum stress on the beams for a given maximum torque, at breaking point for example.

The test body may be made of a material chosen from among the group that includes steel, cast iron, aluminum alloys, and magnesium alloys. The test body may be cast or tooled depending upon the materials used, the geometry of the beams, and acceptable costs, as may be determined by an expert in the art. When the test body is made of aluminum or a magnesium alloy, the latter may be cast with a metal insert that has grooves for mounting hub 1 on the drive shaft.

Figure 9:
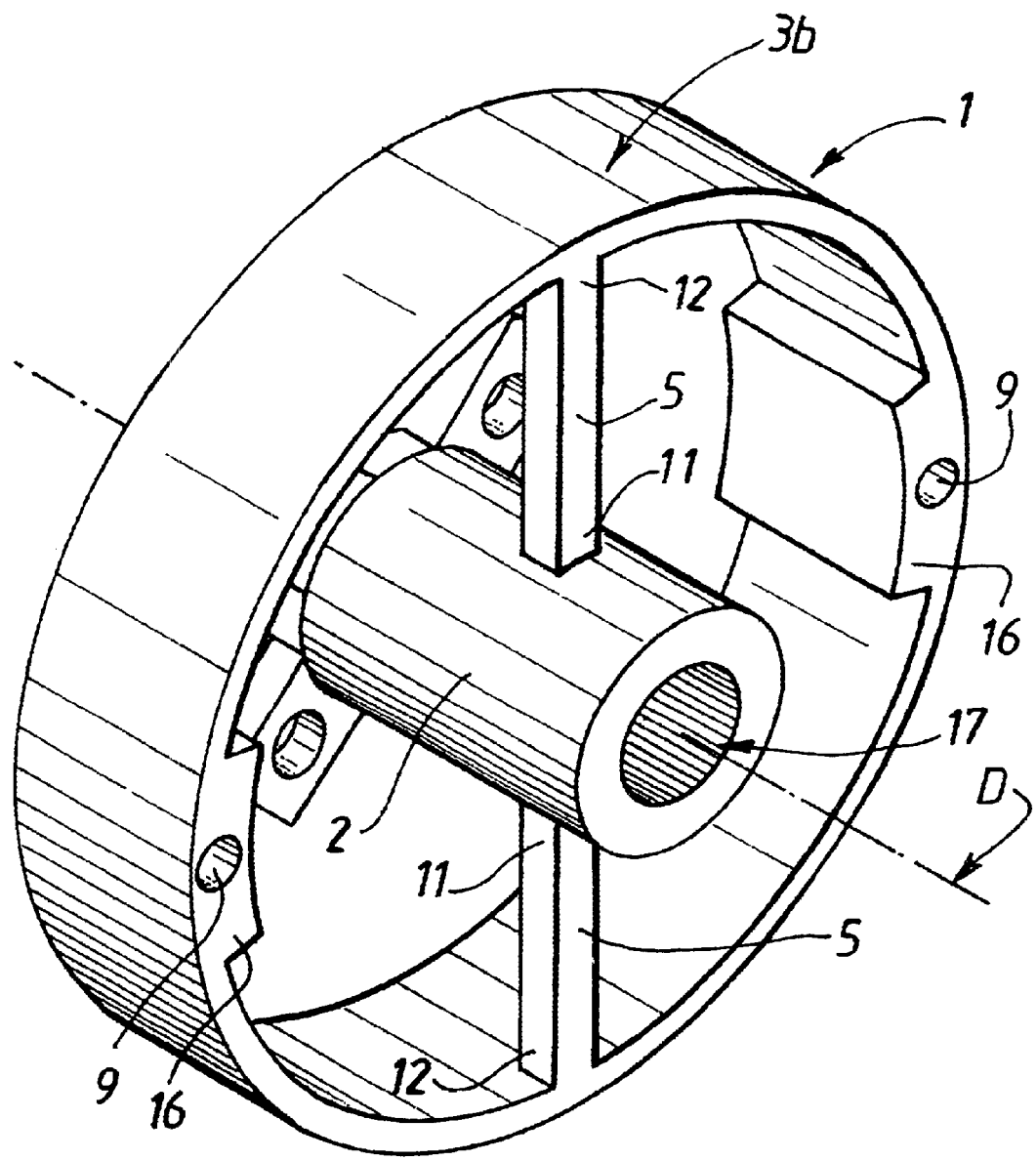
FIG. 9 is a perspective view of a hub with a bending test body illustrating another embodiment of the present invention.
Figure 10:
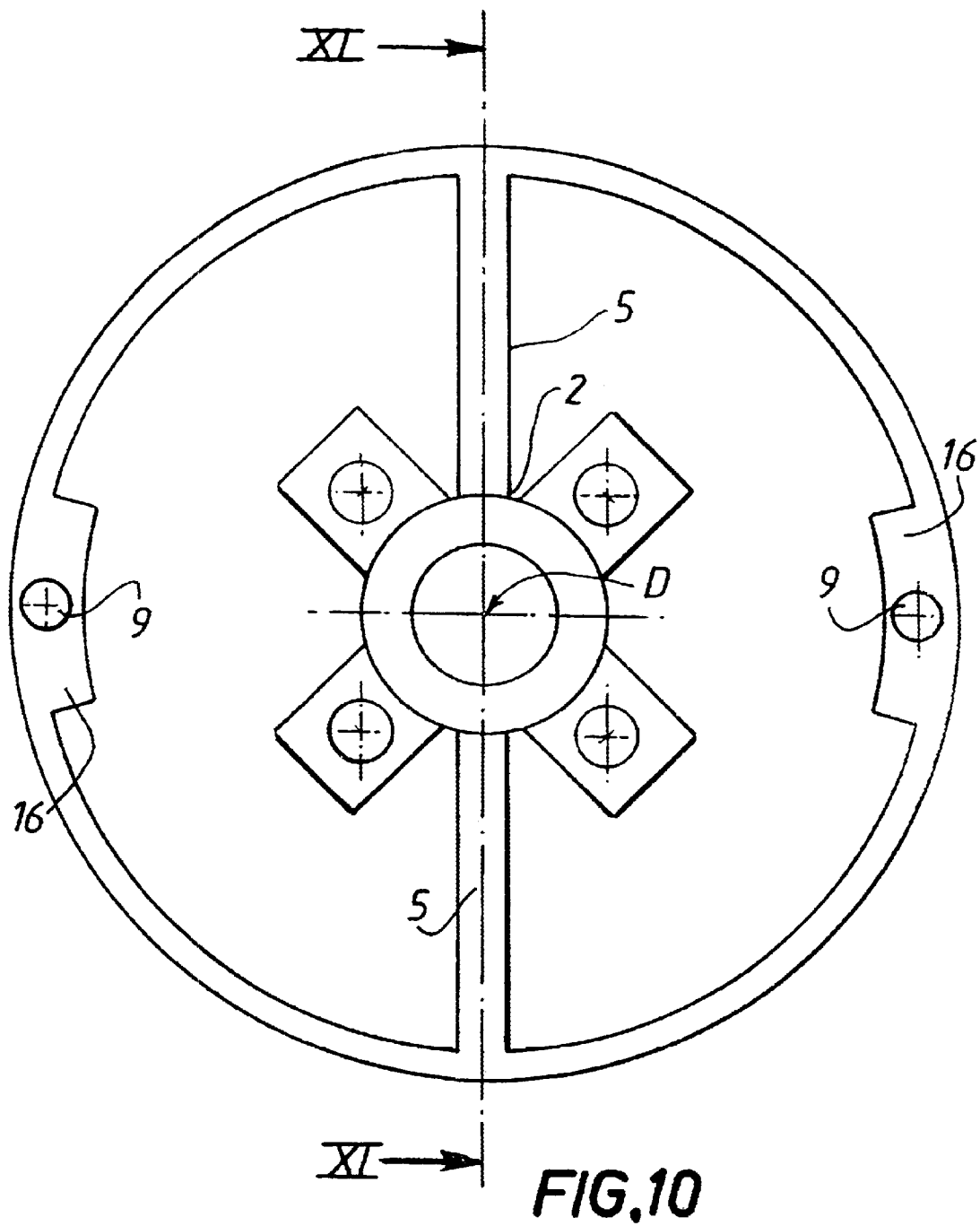
FIG. 10 is a front view of the hub with a bending test body of FIG. 9.

FIGS. 9 through 11 illustrate another embodiment of a hub with a torsion test body. Hub 1 consists of stress-free outer ring 3b whose outer edge is generally cylindrical in shape. This ring 3b is equipped with two housings 9 located in two diametrically opposed projections 16. Between these projections 16 the inner surface of ring 3b is generally cylindrical. Ring 3b is attached to inner ring 2 by means of a beam 5, a web, or any other generally rigid attachment.

In this embodiment, two radial beams 5 made of the same material as inner ring 2 and outer stress-free ring 3b connect the two rings 2, 3b. The cross section of beams 5 is, in this embodiment, square and generally constant from base 11 to head 12, and the beams 5 are roughly aligned. Inner ring 2 has a bore running through it that defines splined adapter 17 for attachment to the drive shaft and, at the opposite end, support surface 18 for the grooved drive shaft. Torsion-deforming tube 4b connects the inner ring to outer deformable ring 3a. In one embodiment, the torsion-deforming tube is open lengthwise, the openings running in the direction of D and separating the bending, torsion-deforming beams.

Deformable ring 3a is rigidly attached to the mechanism that imparts torque to the drive shaft. Screws or comparable fasteners through holes 6 attach hub 1 to the mechanism that imparts torque to the drive shaft. When hub 1 is rigidly attached to the mechanism that imparts torque to the drive shaft, outer deformable ring 3a attached to the torque-imparting mechanism shifts in rotation in relation to outer stress-free ring 3b. The measurement of this small shift by means of Hall effect or magnetoresistant sensors placed in housings 9 and magnets 8' attached to support plate 19 connected to the drive shaft, permits measurement of the torque applied to the drive shaft.

FIG. 12 illustrates another embodiment of a hub with a bending test body. In this embodiment, the elastically deformable mechanisms connecting inner ring 2 and outer deformable ring 3a are in a serpentine shape. The serpentines form several elbows 20 separated by sections that are in the general shape of concentric circular arcs 21. The serpentines run generally along the same plane perpendicular to the axis D of the drive shaft. The thickness of each serpentine is, in this embodiment, generally constant from base 22 to head 23 of the serpentine. In other embodiments, not shown, there are two, three, or more than four serpentines. The thickness of at least one serpentine may vary from its base to its head, as required.

FIGS. 13 and 14 are front views of a hub with a bending test body that comprises more than four deformable beams, in this case twelve beams distributed evenly and radially around axis D. From the starting point of the test body represented in FIG. 13, it is possible to obtain the test body shown in FIGS. 14, whether by tooling or using another comparable method, which has only ten deformable beams of which four act as stops upon application of torque exceeding a given threshold level. The stop is achieved, regardless of the rotation direction required of the transmission shaft, upon reaching a torque threshold value, whereupon end 24 of stop beams 25 comes into contact with the inner projection of nondeforming outer ring 3b.

Depending upon the radial angular positioning of stop beams 25, the maximum admissible torque in a clockwise direction H may be greater than, equal to, or less than the maximum admissible torque in a counterclockwise direction AH. In certain embodiments, the bending-deforming beams described above are cut. When torque is applied, only the beams that are not cut into two sections impart stress, while the sections of cut beams only impart bending stress when an applied torque exceeds a given threshold. The two sections of a cut beam, in one embodiment, are located a given lengthwise distance from one another as a function of the torque threshold value.

In one embodiment, the beam is cut at an angle of approximately 45 degrees in relation to the radial direction of the beam in question. Depending upon the number and positioning of the set of beams, by cutting at least one deformable beam 4a it may be possible, in particular, either to obtain protection against any overloads in both possible rotation directions, or to obtain a torque meter with several ranges of torque measurement, the rigidity of the torque meter increasing as more beams are subject to stress.

FIG. 15 is a perspective view of sensor 8 according to one embodiment. Sensor 8 comprises cylindrical body 26 made of a ferromagnetic material, and magnetic detector 27 designed to be positioned opposite a magnetic field generator such as magnet 8'. Sensor 8 includes, facing magnetic detector 27, stop piece 28 that limits the axial movement of sensor 8 in housings 9. Magnetic detector 27 has sensitive element 29 that is eccentric to the circular cross section of sensor 9 so that the rotation of sensor 8 on axis $O_z$ produces a shift on axis $O_x$ of sensitive element 29.

During factory installation of sensors 8, the operator completes assembly by using appropriate equipment to measure the signal produced by the two sensors 8. This signal is a function of the position of sensitive element 29 vis-a-vis magnetic transition, so that by turning sensor 8 the operator may bring sensitive element 29 opposite the magnetic transition of the magnetic field generator and thereby neutralize the signal. Once this adjustment is made, the sensors are immobilized, with an adhesive for example. This adjustment is referred to as adjustment by eccentricity.

The strength of the signal produced by each magnetic detector 27 may also be modulated by modifying the axial penetration of sensors 8 in housings 9 in such a way as to alter the air gap between detector 27 and opposing magnet 8'. In one mode of embodiment of sensor 8 represented in FIG. 15, the minimum air gap is determined by the space formed by stop 28 which is flattened against the front face of the projections on nondeformable ring 3b. The torque meter is calibrated, for example, by applying a calibrated load and adjusting the signal amplification level.

In another embodiment, an electronic circuit connected to the test body consists of:

a current input to supply power to the Hall effect sensors;

a circuit to filter the signal produced by the sensors in order to eliminate any background noise;

a module to convert the signal from analog to digital;

a module to control and compensate for any drift in the signal transmitted by the sensors caused by temperature, for example in the range of −40 to −80 degrees C; and a safety module that regularly tests the proper functioning of each sensor.

If necessary, the electronic circuit may include a module that makes it possible to set a power steering triggering threshold, a given value threshold, or even a module for wireless or no-contact signal transmission. The electronic circuit may be attached by gluing it, for example, to the front face of nondeforming ring 3b.

Having described the invention, what is claimed is:

1. A device to measure torque on a turning shaft, the measuring device comprising:

a mounting hub, positioned about a shaft, for applying torque to the shaft;

deformable support means extending radially inwardly from the mounting hub to the shaft for supporting the mounting hub relative to the shaft such that torque applied to the mounting hub results in elastic deformation of the support means and relative rotation of the mounting hub about the shaft; and a sensor, fixed with respect to the shaft, for sensing relative movement of the mounting hub to produce a signal proportional to torque applied by the mounting hub to the shaft.

2. A torque measuring device according to claim 1, wherein the mounting hub is a first annular ring concentric with the shaft.

3. A torque measuring device according to claim 1, wherein the sensor is a magnetic sensor for sensing a magnetic field produced by a magnet to be fixed with respect to the mounting hub.

4. A torque measuring device according to claim 1, further comprising at least one additional sensor for producing an additional signal that may be combined with the signal produced by the first sensor to provide a signal more accurately corresponding to torque applied by the mounting hub to the shaft than the signal produced by the first sensor.

5. A torque measuring device according to claim 1, wherein the sensor is located in a first plane perpendicular to the shaft for sensing a target fixed with respect to the mounting hub in a second plane perpendicular to the shaft, displaced axially with respect to the first plane.

6. A torque measuring device according to claim 2, wherein the sensor is mounted on a second annular ring fixed with respect to the shaft, and the first and second annular rings are coaxial and have approximately the same diameter.

7. A torque measuring device according to claim 2, wherein the deformable support means includes an elastically deformable beam that runs radially from the first annular ring toward the shaft.

8. A torque measuring device according to claim 7, wherein the deformable support means further comprises at least one additional elastically deformable beam that runs radially from the first annular ring toward the shaft.

9. A torque measuring device according to claim 8, wherein the elastically deformable beams are equidistant from one another.

10. A torque measuring device according to claim 8, wherein the elastically deformable beams are irregularly spaced with respect to each other.

11. A torque measuring device according to claim 8, wherein the elastically deformable beams have a height, defined in an axial direction, and the height of at least one elastically deformable beam varies along a radial length of the elastically deformable beam.

12. A torque measuring device according to claim 8, wherein the elastically deformable beams have a thickness, defined in a circumferential direction, and the thickness of at least one elastically deformable beam varies along a radial length of the elastically deformable beam.

13. A torque measuring device according to claim 11, wherein the elastically deformable beams have a thickness, defined in a circumferential direction, and the thickness of the beams remains constant along a radial length of the elastically deformable beams.

14. A torque measuring device according to claim 12, wherein the elastically deformable beams have a height, defined in an axial direction, and the height of the beams remains constant along a radial length of the elastically deformable beams.

15. A torque measuring device according to claim 11, wherein the height of the elastically deformable beams varies at a linear rate along a radial length of the elastically deformable beams.

16. A torque measuring device according to claim 11, wherein the height of the elastically deformable beams varies at a polynomial rate along a radial length of the elastically deformable beams.

17. A torque measuring device according to claim 12, wherein the thickness of the elastically deformable beams varies at a linear rate along a radial length of the elastically deformable beams.

18. A torque measuring device according to claim 12, wherein the thickness of the elastically deformable beams varies at a polynomial rate along a radial length of the elastically deformable beams.

19. A torque measuring device according to claim 6, wherein the second annular ring is fixed with respect to the shaft by means of a beam that is directed radially from the second annular ring toward the shaft.

20. A torque measuring device according to claim 19, further comprising additional beams directed radially from the second annular ring toward the shaft for fixing the second annular ring with respect to the shaft.

21. A torque measuring device according to claim 20, wherein the beams are equidistant from one another.

22. A torque measuring device according to claim 20, wherein the beams are irregularly spaced with respect to each other.

23. A torque measuring device according to claim 19, wherein the deformable support means includes at least one elastically deformable beam that runs radially from the first annular ring toward the shaft, and wherein the beams fixing the second annular ring are placed roughly on the same radial plane as the elastically deformable beams.

24. A torque measuring device according to claim 19, wherein the deformable support means includes at least one elastically deformable beam that runs radially from the first annular ring toward the shaft, and wherein the beams fixing the second annular ring have roughly the same geometric shape as the elastically deformable beams.

25. A torque measuring device according to claim 19, wherein the deformable support means includes at least one elastically deformable beam that runs radially from the first annular ring toward the shaft, and wherein the elastically deformable beams and the beams fixing the second annular ring are each four in number.

26. A torque measuring device according to claim 1, wherein the deformable support means includes a torsion-deforming tube.

27. A torque measuring device according to claim 26, wherein the torsion-deforming tube has at least two openings running in an axial direction with respect to the shaft and separating the torsion-deforming tube into elastically deformable beams.

28. A torque measuring device according to claim 26, wherein the sensor is mounted on a second annular ring fixed with respect to the shaft by at least one beam that runs radially from the second annular ring toward the shaft.

29. A torque measuring device according to claim 28, wherein the second annular ring is fixed with respect to the shaft by two beams that are directed radially from the second annular ring toward the shaft.

30. A torque measuring device according to claim 19, wherein the mounting hub is a first annular ring concentric with the shaft, and wherein the first annular ring, the second annular ring, and the deformable support means are formed of the same material.

31. A torque measuring device according to claim 1, wherein the deformable support means includes a serpentine shape.

32. A torque measuring device according to claim 31, wherein there are several elastically deformable members of serpentine configuration running radially from the mounting hub toward the shaft.

33. A torque measuring device according to claim 1, further comprising application means for applying the torque measuring device to an automobile power steering mechanism.

* * * * *